United States Patent [19]
Yamaguchi

[11] Patent Number: 5,802,012
[45] Date of Patent: Sep. 1, 1998

[54] SYNTHETIC-APERTURE SONAR SYSTEM

[75] Inventor: Isao Yamaguchi, Tokyo, Japan

[73] Assignee: NEC Corporation, Tokyo, Japan

[21] Appl. No.: 964,713

[22] Filed: Nov. 5, 1997

[30] Foreign Application Priority Data

Nov. 6, 1996 [JP] Japan ................. 8-293896

[51] Int. Cl.$^6$ ................. G01S 15/89
[52] U.S. Cl. ................. 367/88
[58] Field of Search ................. 367/88, 105; 342/25

[56] References Cited

PUBLICATIONS

Kondo et al., "Digital Signal Processing for Measurement and Sensors" *Shoko–Do* pp. 74–88 (1993).
Bruce, "A Processing Requirement and Resolution Capability Comparison of Side–Scan and Synthetic–Aperture Sonars" *IEEE Journal of Occanic Engineering* 17:106 and 110–113 (1992).

*Primary Examiner*—Daniel T. Pihulic
*Attorney, Agent, or Firm*—Foley & Lardner

[57] ABSTRACT

A synthetic-aperture sonar system of the present invention includes a range curvature compensating section having a divided aperture propagation time calculation 32. The calculation 32 calculates a round-trip signal propagation time on the basis of a divided aperture for transmission and a divided aperture for reception, thereby calculating a range curvature correction time. A transmission/reception section includes a PRF (Pulse Repetition Frequency) modificator and a divided aperture switch. The PRF modificator adjusts PRF such that a ratio between the aperture length and the divided aperture length of the transducer is an integral multiple. The divided aperture switch 16 switches the outputs of elements on the transducer each being assigned to one of the divided apertures, produces a sum of the outputs of the individual element on each divided-aperture, and feeds the sum to a range compressing section. With this configuration, the system reduces range curvature compensation errors, prevents the transducer from being scaled up, and eases limitations on the number of multi-transmission/reception ascribable to a platform speed.

5 Claims, 12 Drawing Sheets

SYNTHETIC-APERTURE SONAR SYSTEM

BACKGROUND OF THE INVENTION

The present invention relates to a synthetic-aperture sonar system and, more particularly, to a synthetic-aperture sonar system for seabed observation and using a multi-aperture transmission reception system.

To implement high resolution imagery with a small aperture transducer, synthetic-aperture sonar systems of the type described have customarily included a single-beam transducer, a range compressing section, a range curvature compensating section, an azimuth compressing section, and a display section which are based on synthetic-aperture radar technologies. This kind of configuration is taught in, e.g., Norimasa Kondo et al "Digital Signal Processing for Measurement and Sensors", Shoko-Do, pp. 74–88, May 1993.

The platform speed is often limited in operation of synthetic-aperture sonar with the single-beam transmission-reception. In order to solve this problem, a multi-aperture transmission system has been proposed which has a plurality of divided apertures on a transducer, as discussed in, e.g., Michael P. Bruce "A Processing Requirement and Resolution Capability Comparison of Side-Scan and Synthetic-Aperture Sonars", IEEE Journal of Oceanic Engineering, Vol. 17, No. 1, p. 106 and pp. 110–113, JANUARY 1992. The multi-aperture transmission system simultaneously receives multiple signals on individual divided-aperture with a single transmission.

Figure 9:
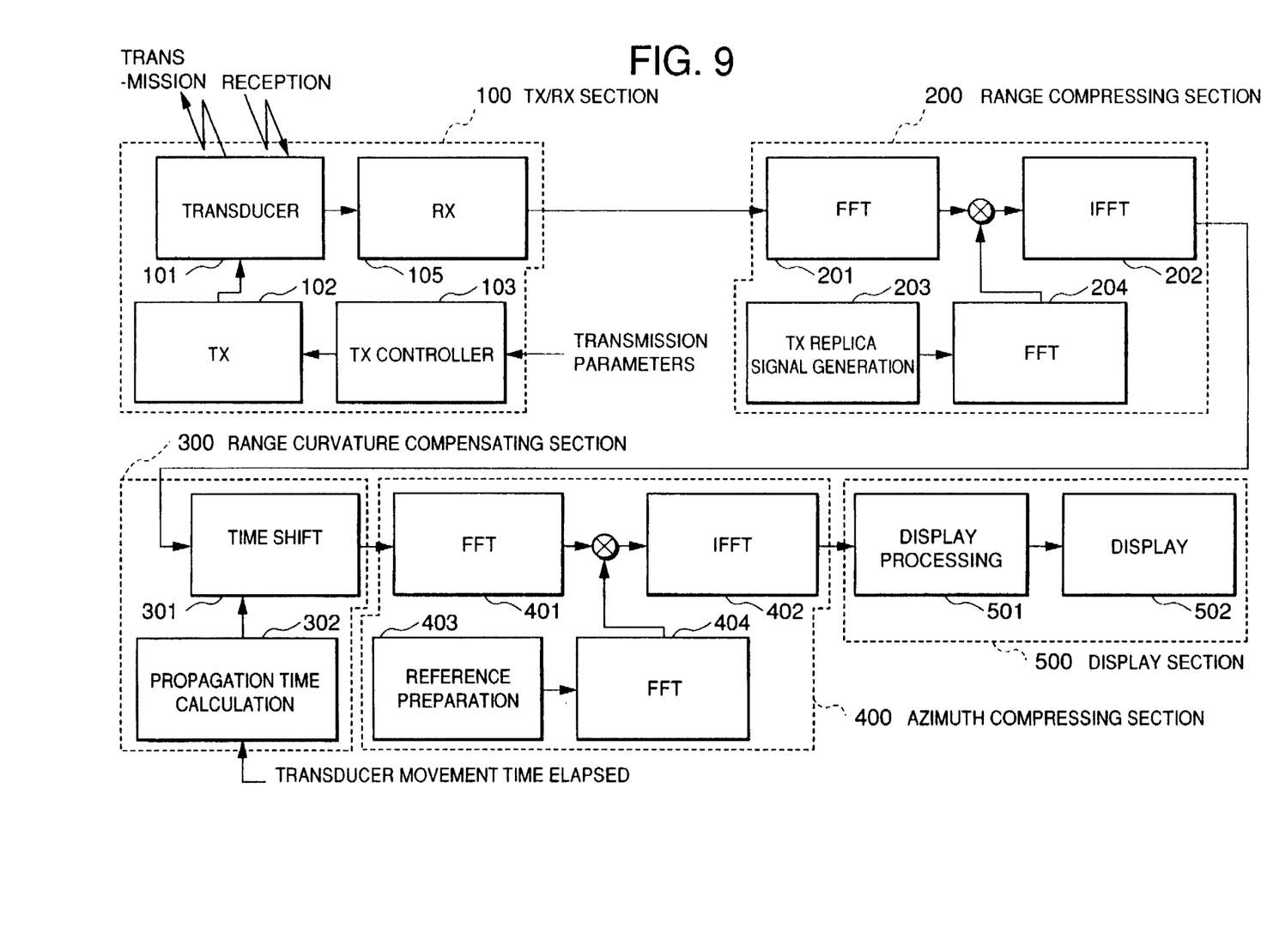
FIG. 9 is a block diagram schematically showing a conventional synthetic-aperture sonar system.

FIG. 9 shows a conventional synthetic-aperture sonar system. As shown, the sonar system has a transmission/reception section 100, a range compressing section 200, a range curvature compensating section 300, an azimuth compressing section 400, and a display section 500.

The transmission/receipt section 100 is made up of a transducer 101, a transmitter (TX) 102, a transmission (TX) controller 103, and a receiver (RX) 105. Principally the section 100 generates and transmits signals due to externally input, transmission parameters and amplifies received echoes, and then performs frequency conversion and analog-to-digital conversion with the received echoes.

The range compressing section 200 has an FFT (Fast Fourier Transform), an IFFT (Inverse Fast Fourier Transform) 202, a transmission replica signal generation 203, and another FFT 204. The section 200 determines a correlation between the received signal and a reference signal prepared beforehand and compresses the received echo to thereby increase the range resolution.

The range curvature compensating section 300 determines a propagation time between the individual transmission/receipt position on the synthetic aperture and the position of a beam focus. The transmission/ reception position is calculated by use of a time elapsed during platform movement and a platform speed, while the beam focus position is calculated by use of a time elapsed after a transmission. Further, the section 300 calculates a range curvature compensation value by determining a difference between the propagation time at the individual position of transmission/reception and the propagation time at the center of the synthetic aperture. The section 300 also shifts the received data by the compensation time so as to equalize the propagation time between the individual transmission/reception position and the beam focus. For this purpose, the section 300 has a time shift 301 and a propagation time calculation 302.

The azimuth compressing section 400 has an FFT 401, an IFFT 402, a reference preparation 403, and another FFT 404.

The section 400 samples the output of the range curvature compensating section 300, in the direction of movement of the transducer where the section 300 has a two dimensional matrix data whose axes are direction of transmission and the direction of movement of the transducer. The section 400 determines a correlation between the sampled data and a reference function calculated range by range, thereby compressing the signal. This increases resolution in the azimuth direction.

The display section 500 displays the azimuth-compressed compressed signal on a screen and has a displaying processing 501 and a display 502.

In operation, the transducer 101 implemented by a plurality of elements transforms an transmission signal, which is output from the transmitter 102, from electric to a sound wave, and transmits the wave. Also, the transducer 101 transforms received sound wave signals to electric signals and feeds the signals to the receiver 105. The transducer 101 is mounted on a ship or an under-water vehicle and transmits and receives periodically, while moving on a straight trajectory. The transmission reception periodical intervals are referred to as a pulse repetition interval, and its reciprocal is referred to as a pulse repetition frequency (PRF). The transmitter 102 generates a transmission signal on the basis of transmission parameters controlled by the transmission controller 103 and including a transmission frequency, pulse width, and PRF. The transmitter 102 also amplifies the generated signal and sends the amplified signal to the transducer 101. The receiver 105 amplifies echo signals received at the transducer 101, performs frequency conversion and analog-to-digital conversion with the amplified signal, and then delivers the resulting digital signal to the range compressing section 200. Where, an echo signal is defined as a signal at a receiving point, which is once transmitted and reflected from an object.

The range compressing section 200 compresses the pulse width on the basis of a correlation between the echo signal and a transmission replica signal output from the transmission replica signal generation 203. Specifically, to determine the correlation, the FFT 201 and 204 respectively perform FFT processing with the received signal and transmission replica signal so as to transform them to signals lying in the frequency domain, and multiplies the frequency domain signals. Subsequently, the IFFT 202 excutes IFFT processing with the resulting product to thereby recover signals lying in the time domain.

In the range curvature compensating section 300, the propagation time calculation 302 calculates a propagation time by use of the individual transmission position derived from the time elapsed during the movement of the platform and the position of the beam focus derived from the time elapsed after a transmission. By producing a difference between the calculated propagation time and the propagation time of the transmission/receipt position which is the center of the synthetic aperture, the calculation 300 calculates a range curvature compensation value. The time shift 301 shifts the individual data with respect to time in accordance with the range curvature compensation time output from the calculation 302.

Figure 10:
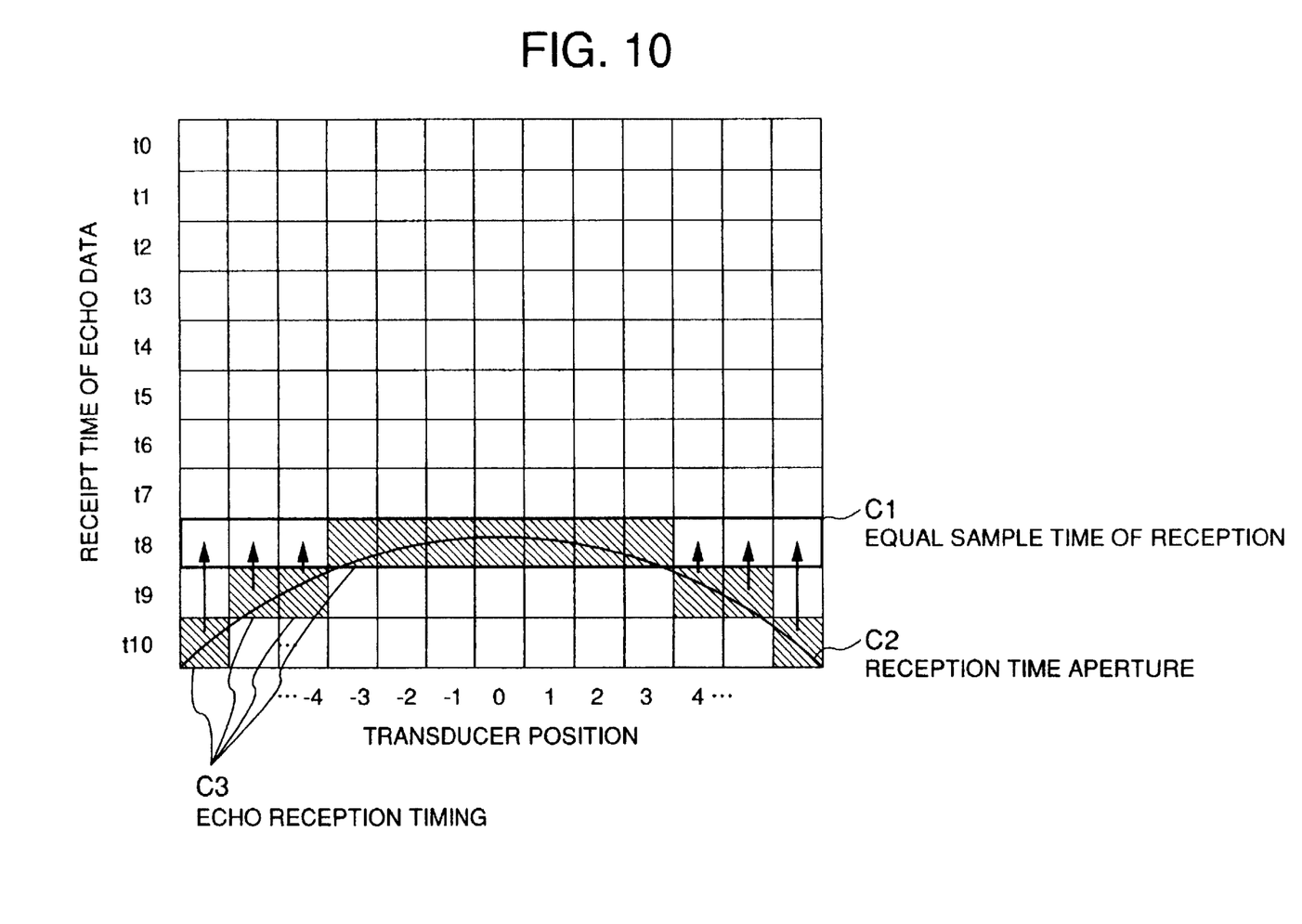
FIG. 10 is a timing chart demonstrating a range curvature compensation procedure particular to the conventional system shown in FIG. 9.

FIG. 10 shows the timing for shifting the time and particular to the above range curvature compensation. An echo signal received at the individual position of a transducer moving over a synthetic aperture do not have a same timing of round-trip propagation because of the difference distance between the individual transducer position and the beam focus point. As a result, echo data sampled at the individual transmission/receipt position are received discretely at timings C3 indicated by hatching in FIG. 10. The echo data receipt timings C3 are distributed on a parabola represented by aperture receipt times C2 calculated from the transmission/receipt positions and beam focus positions. Because the subsequent azimuth compression section 400 samples the data at each receipt time in the direction of the transmission/receipt position, the data received at the timings C3 are shifted in time such that they coincide at an equal receipt sample time C1 at which the propagation time is the same. To produce an amount of shift, the aperture reception time at a transmission/receipt position 0, where the propagation time of the center of the synthetic aperture is minimum, is used as a reference. For each of the data received at the timings C3, a difference between the aperture reception time of the respective position and the above reference is produced to thereby output an amount of shift. In FIG. 10, the data at the transducer positions −3 through 3 are not shifted while the data at the positions −4 and 4 are shifted from a time t9 to a time t8, and the data at both ends are shifted from a time t1 to a time t8.

The azimuth compressing section 400 determines a correction between the data on the equal reception sample time line produced for each target distance and a range-by-range estimated signal and thereby compresses the reception echo pulse width in the direction of movement of the transducer. As a result, the focus is positioned at a target. The section 400, like the range compressing section 200, causes its FFTs 401 and 404 to execute FFT processing so as to transform the data output from the range curvature compensation 300 and the estimated signal output from the reference preparation 403 to frequency domain data, multiples the frequency domain data, causes the IFFT 402 to execute IFFT processing with the resulting product, and thereby recovers time domain data.

In the display section 500, the display processing 501 detects the output signal of the azimuth compressing section 400 and thresholds the detected signal. The resulting output of the display processing 501 appears on the display 502 in the form of an image.

Figure 11A:
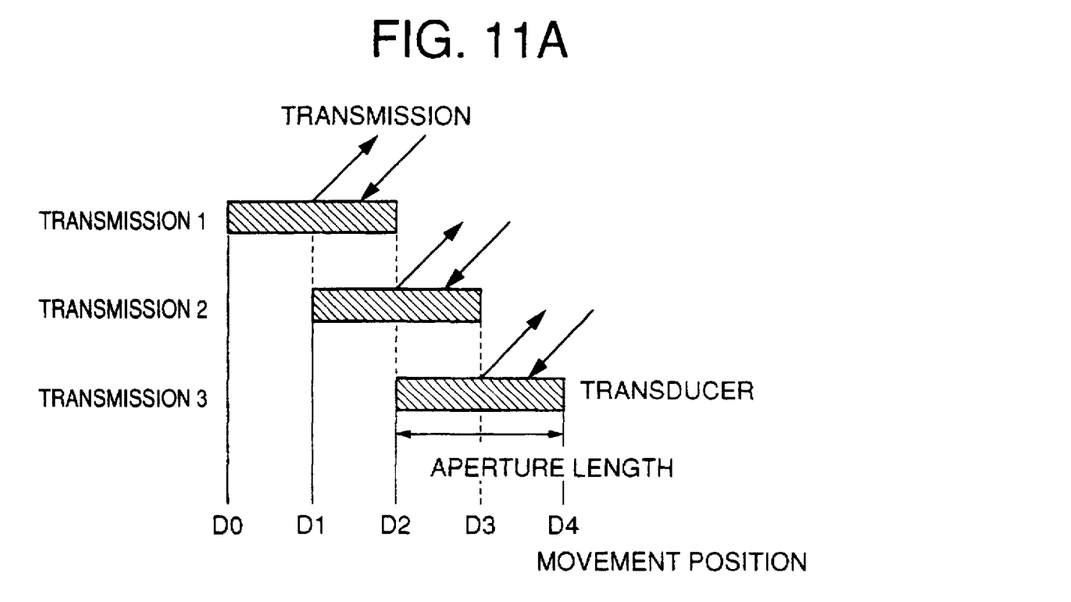
FIGS. 11A and 11B respectively show a conventional usual transmission/reception operation and a conventional multi-aperture transmission/reception operation.
Figure 11B:
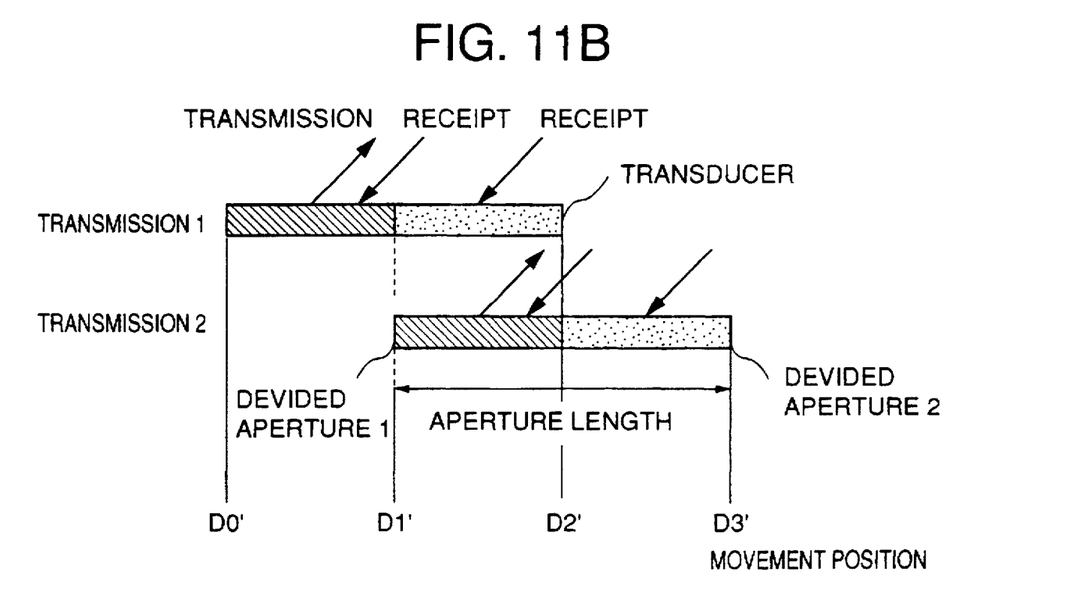

FIGS. 11A and 11B show specific transducer positions to occur during the transmission and receipt of a conventional synthetic-aperture sonar. Assume that a size exists only in relation to the horizontal positions of movement, i.e., let a size in the vertical direction be neglected. FIG. 11A shows transducer positions occurring in a usual transmission system. As shown, a transducer repeats transmission and receipt white moving by one half of its aperture length at a time. The positions of the transducer are labeled D0–D4. FIG. 11B shows transducer positions particular to a conventional multi-aperture transmission system. As shown, a transducer has an aperture length which is twice as great as the aperture length of the usual transmission system. One half of the transducer is assumed to be a divided aperture 1; transmission and reception are repeated via the divided aperture 1. The other half of the transducer is assumed to be a divided aperture 2 and exclusively assigned to reception. The positions of the transducer are labeled D0'–D3'. In this case, the interval of movement is equal to the aperture length of the transducer for use in the usual transmission system. It will be seen that the multi-aperture system implements two times of received data for a single transmission and thereby doubles the platform speed.

Figure 12A:
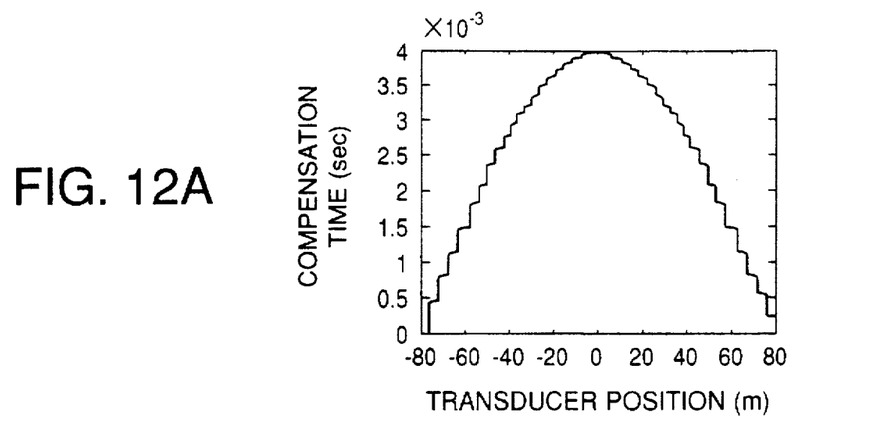
FIGS. 12A–12C are graphs respectively showing a range curvature compensation time, a range curvature compensated output signal, and an azimuth compressed output signal produced when the conventional system is applied to multi-aperture transmission/reception.
Figure 12B:
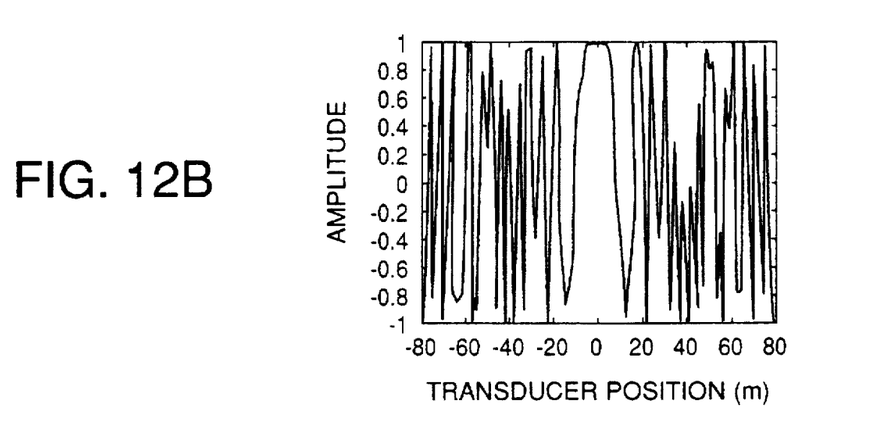
Figure 12C:
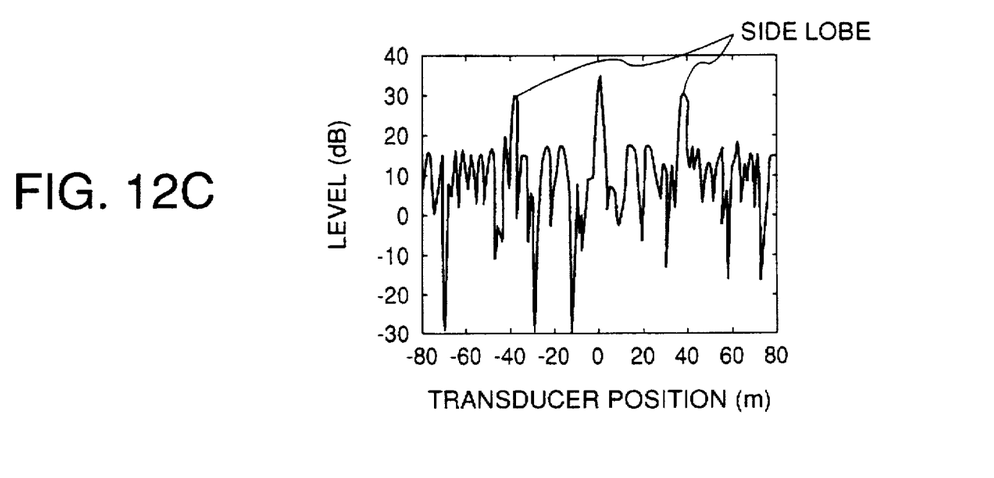

Specific outputs available with the conventional sonar system shown in FIG. 9 will be described with reference to FIGS. 12A–12C. The outputs to be described were produced when the frequency was 5 kHz, the hull speed was 1 m/s, and the divided aperture length was 2 m. FIG. 12A shows a specific output of the propagation time calculation 302, i.e., range curvature compensation times output when the system of FIG. 9 was applied to multi-aperture transmission/reception. In FIG. 12A, the abscissa indicates the position of the transducer by using the center of the synthetic aperture as an original while the ordinate indicates the compensation time. FIG. 12B shows a specific output of the range curvature compensating section 300, i.e., a range curvature compensation output signal appeared when the system of FIG. 9 was applied to multi-aperture transmission/reception. Further FIG. 12C shows a specific output of the azimuth compressing section 400, i.e., an azimuth compression output signal appeared when the system of FIG. 9 was applied to multi-aperture transmission/reception.

As FIG. 12B indicates, the signal undergone range curvature compensation is distorted. As a result, a side lobe is increased, as shown in FIG. 12C.

The conventional synthetic-aperture sonar system having the above construction has some problems left unsolved, as follows.

A first problem is that when the system is applied to the multi-aperture transmission/reception system, a phase difference occurs and deteriorates the synthetic-aperture image. Specifically, for the conventional range curvature compensation, a signal propagation time is produced on the basis of the center position of the transducer. As a result, errors occur in propagation time when it comes to the multi-aperture transmission system whose transmission position and receipt position are different from each other.

A second problem is that the conventional multi-aperture transmission/reception system has a broad aperture area and can be mounted only to ships of particular sizes. This is particularly true with underwater vehicles or similar small vessels. This problem is ascribable also to redundancy stemming from the fact that the transducer applicable to the conventional multi-aperture system causes unused aperture portions.

A third problem is that because the transducer size applicable to the conventional multi-aperture transmission/reception system is limited by the second problem, it is sometimes impracticable to implement a number of multi-transmission/reception necessary for a required platform speed. In such a case, the same number of divided apertures as the required multi-transmission/receptions cannot be implemented on the transducer. The prerequisite with a synthetic-aperture sonar is that the distance of movement allowable during a single transmission and reception be less than one half of the aperture length of the transducer. Consequently, a trade-off sometimes occurs between the hull speed and the above allowable distance of movement of the transmitter/receiver. This requires the transducer's aperture length to be increased in order to satisfy the required platform speed. However, because the transducer size is limited by the second problem, the transducer's aperture length cannot be increased.

SUMMARY OF THE INVENTION

It is therefore an object of the present invention to provide a synthetic-aperture sonar system capable of reducing range curvature compensation errors, preventing a transducer size being larger, and easing limitations on the number of multi-transmission/reception ascribable to a platform speed.

In accordance with the present invention, a synthetic-aperture sonar system includes a transmission/reception section. The transmission/reception section has a transducer having an aperture divided into a plurality of divided apertures one of which is assigned to transmission and reception of a sound wave and the others of which are assigned to reception of a sound wave, a PRF modificator which automatically adjusts an ratio be an integer of the transducer's aperture length and divided aperture length by modifying the PRF tuned by the platform velocity and the divided aperture length, and which controls switching of assigned divided-apertures. This section also have a transmitter, a transmitter controller for controlling the transmitter in accordance with control parameters of the PRF modificator and other parameters, the transmitter generating a transmission sound wave in response to a command output from the transmitter controller and outputting the sound wave signal to the divided aperture assigned to transmission and reception, a receiver which amplifies a received sound wave signal from the transducer and digitizing the received sound wave signal. Moreover, the section has divided aperture switch which temporarily holds outputs of elements included in the transducer, and which switches, and add the output of the elements under the control of the PRF modificator. The synthetic aperture sonar has a range compressing section which compresses the pulse width of the received sound signals in the direction of transmission. A range curvature compensation section synchronizes reception times of the divided apertures with respect to outputs of the range compressing section. An azimuth compressing section compresses the pulse widths of the outputs of the range curvature compensating section in the direction of platform movement. A display section executes display processing with the outputs of the azimuth compression section and displays the processed outputs in the form of an image.

Also, in accordance with the present invention, a synthetic-aperture sonar system includes a transmission/reception section which has a transducer having an aperture divided into a plurality of divided apertures one of which is assigned to transmission and reception of a sound wave and the others of which are assigned to reception of a sound wave, for generating, controlling and transmitting a sound wave signal to be transmitted, and for amplifying and digitizing a received sonic wave signal and outputting the resulting digital signal to a next stage. A range compressing section compresses the pulse width of the received sound signals in the direction of transmission. A divided aperture propagation time calculating section determines a range curvature correction time on the basis of a sound wave signal propagation time between a beam focus and the divided aperture assigned to transmission and reception and a sound wave signal propagation time between the beam focus and the divided aperture assigned to reception. A range curvature compensating section automatically compensates phase differences between the divided apertures by time shifting in accordance with the range curvature compensation time. An azimuth compressing section executes pulse width compression with the outputs of the range curvature correcting section in the direction of movement of a platform. A display section executes display processing with the outputs of the azimuth compression section and displays the processed outputs in the form of an image.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
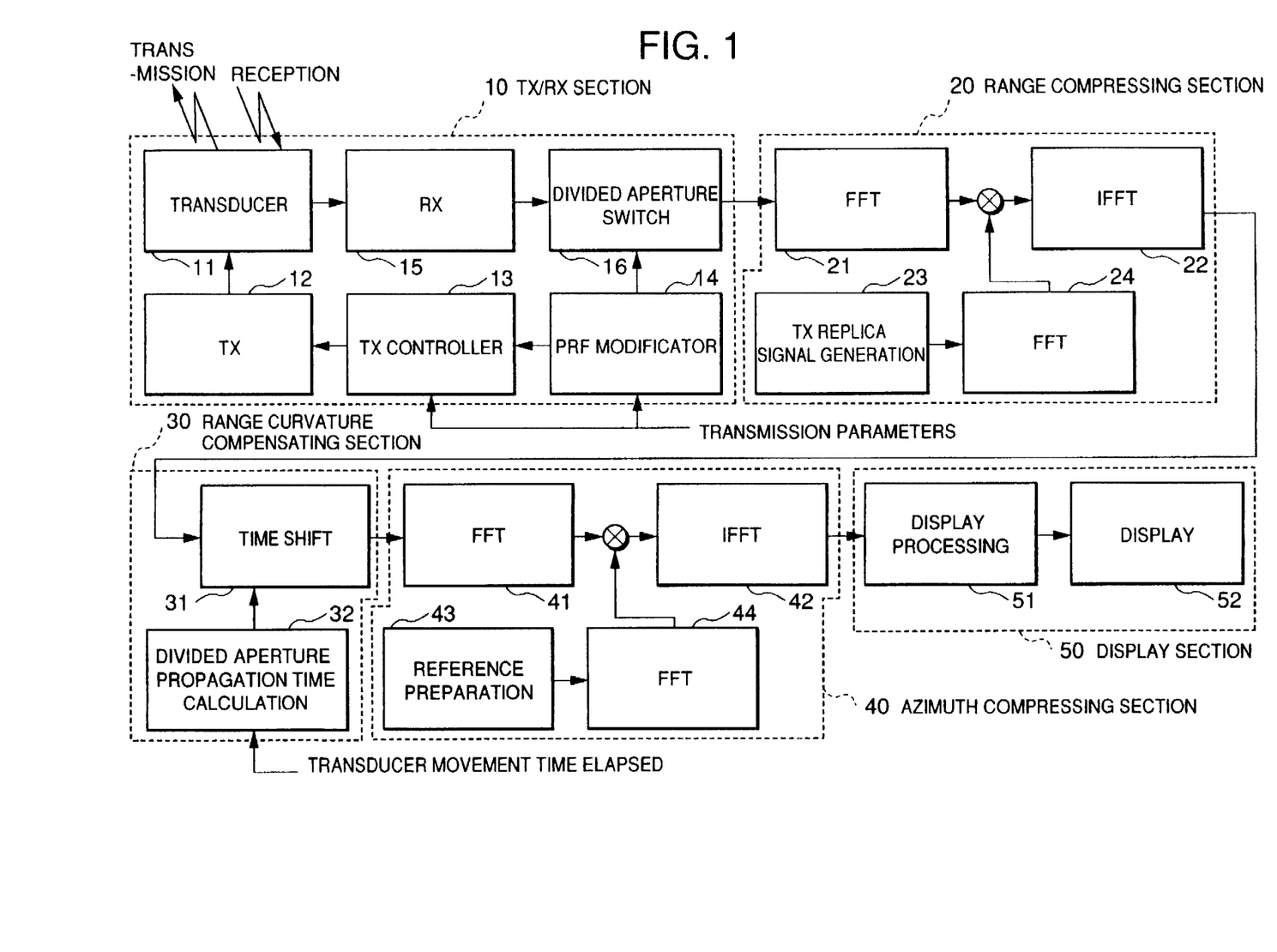
FIG. 1 is a block diagram schematically showing a synthetic-aperture sonar system embodying the present invention.

Referring to FIG. 1 of the drawings, a synthetic-aperture sonar system embodying the present invention is shown. As shown, the system is generally made up of a transmission/reception section 10, a range compressing section 20, a range curvature compensating section 30, an azimuth compressing section 40, and a display section 50. The range compressing section 20, azimuth compressing section 40 and display section 50 are respectively identical with the sections 200, 400 and 500 of the conventional sonar system shown in FIG. 10.

The transmission/reception section 10 includes a transducer 11, a transmitter 12, a transmission controller 13, a PRF modificator 14, receiver 15, a divided aperture switch 16. The transducer 11 having an aperture which can be divided into a single divided aperture for transmission and reception and a plurality of divided apertures for reception. A transmitter 12 generates a transmission signal and indicated by a transmission controller 13, amplifies the signal, and delivers the amplified signal to the transducer 11. The transmission controller 13 controls the transmitter 12 with a transmission frequency, pulse width, transmission interval and other various transmission parameters. A PRF modificator 14 finely adjusts, among the various transmission parameters, the platform speed, divided aperture length, pulse repetition frequency and so forth such that one half of the aperture of the transducer 11 is an integral multiple of the divided aperture length. A receiver 15 amplifies received signals input from a plurality of elements constituting the transducer 11, transforms the amplified signals to digital signals, and outputs the digital signals to a divided aperture switch 16. The divided aperture switch 16 holds, switches and adds the outputs of the selected elements of the transducer and feeds the resulting signals to the range compression 20 under the control of the PRF modificator 14.

The range curvature correcting section 30 is made up of a divided aperture propagation time calculation 32 and a time shift 31. The propagation time calculation 32 determines a round-trip propagation time on the basis of a beam focus position derived from a time elapsed after a transmission and a divided aperture position for transmission/reception and a reception divided aperture position derived from a time elapsed during the movement of the transducer and the divided aperture position on the transducer. Then, the calculation 32 calculates a range curvature correction value based on the round-trip propagation time. The time shift 31 holds the output of the range compressing section 20 and shifts it by the range curvature compensation time.

The operation of the above synthetic-aperture sonar system will be described hereinafter.

Figure 2:
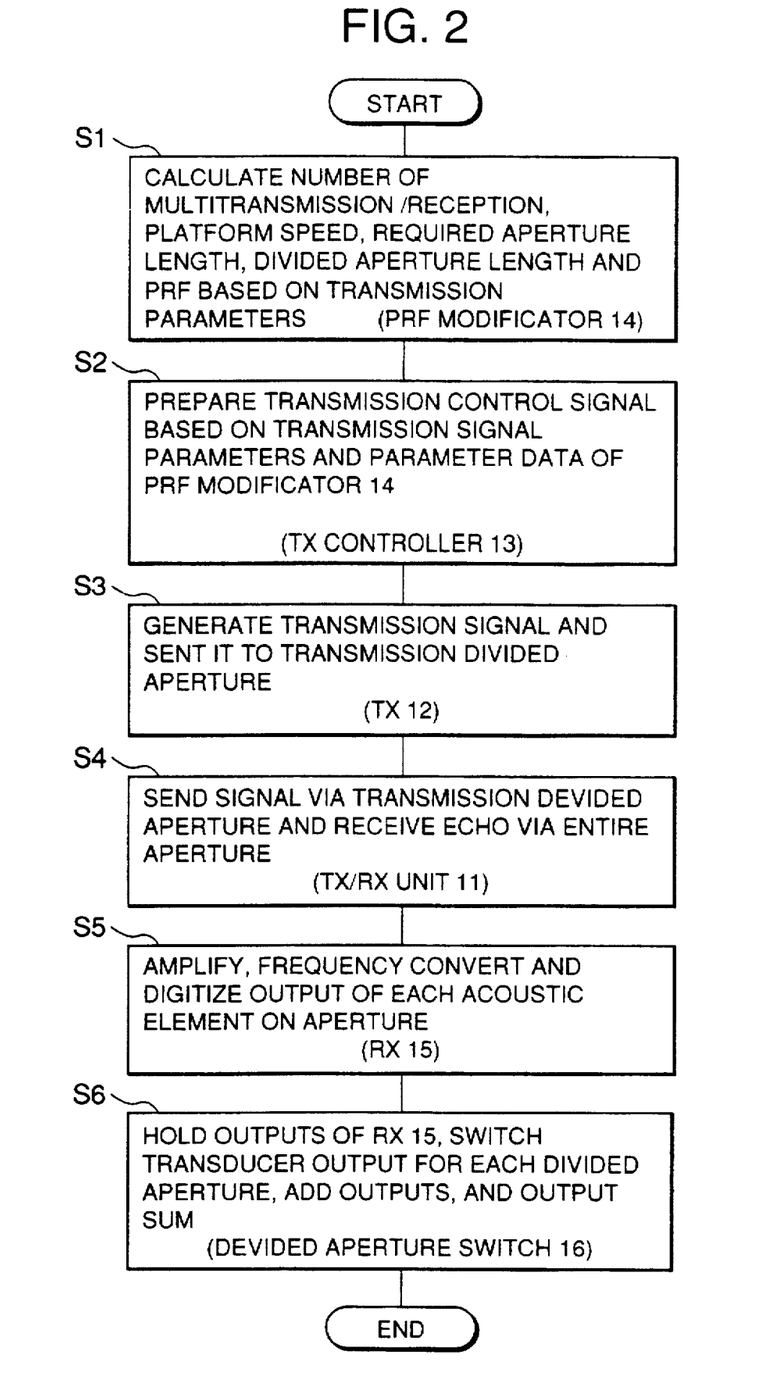
FIG. 2 is a flowchart demonstrating a specific operation of a transmission/reception section included in the embodiment of FIG. 1.

Reference will first be made to FIG. 2 for describing the operation of the transmission/reception section 10. The PRF modificator 14 calculates, based on the transmission parameters, the number of apertures for multi-transmission/reception, platform speed, required aperture length, divided aperture length, and PRF. Specifically, in order to modify PRF, the PRF modificator 14 renders the platform speed and the number of elements on the transducer 11 to be used variable, thereby controlling the divided aperture length (S1). The resulting PRF modified control data are fed to the transmission controller 13 and divided aperture switch 16.

The transmission controller 13 generates a transmission control signal based on the control data input from the PRF modificator 14 and externally input transmission signal parameters. With the control signal, the controller 13 controls the transmitter 12 in order to deliver the transmission signal into the specified divided-apertures (S2). The transmitter 12 generates a transmission signal due to transmission parameters and controls signals determined in the PRF modificator 14, amplifies the signals, and feeds the signals into the divided aperture for the transmission/reception on the transducer (S3).

The transducer 11 transmits the above signal via a divided aperture for transmission/reception while receiving the resulting echo signal via the entire aperture including divided apertures (S4).

The receiver 15 amplifies the received signals fed from the elements constituting the transducer 11, executes frequency conversion with the received signals, digitizes the frequency converted signals, and outputs the resulting digital signals to the divided aperture switch 16 (S5).

The divided aperture switch 16 hold the received data of all apertures and is under control of PRF modificator 14. And the divided aperture switch 16 also divides appropriate received signals from the whole elements of the transducer to the selected divided apertures, and adds the each signal in the divided-aperture. Then the resulting data is delivered to the range compressing section 20 (S6).

Figure 3:
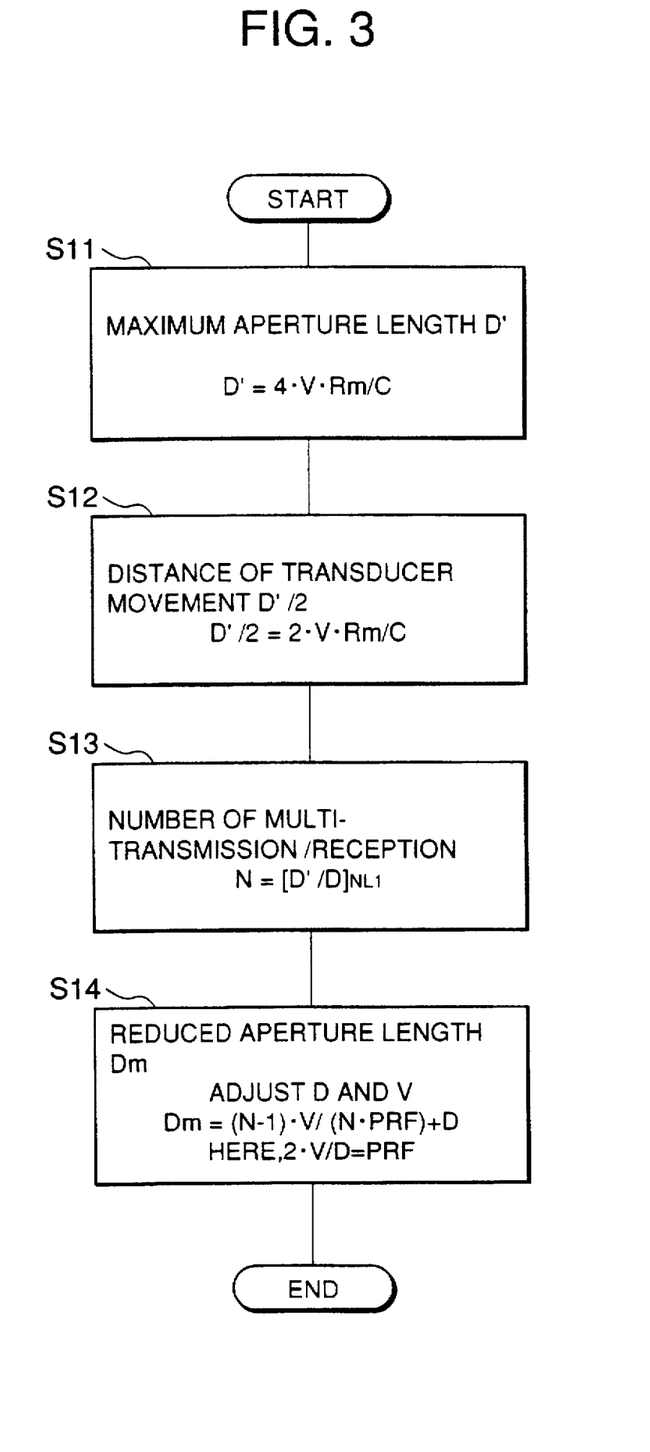
FIG. 3 is a flowchart representative of a specific operation of a PRF modificator also included in the embodiment of FIG. 1.

FIG. 3 shows calculations to be performed by the PRF modificator 14. As shown, the maximum necessary aperture length is determined (S11), and then a distance of the platform movement in a period of transmission and reception is determined (S12). Subsequently, a required number of multi-transmission/reception is calculated (S13). The platform speed and divided aperture length are adjusted such that the integral multiple of the divided aperture length is one half of the maximum aperture length, thereby producing a reduced transducer's aperture length (S14). In FIG. 3, D' denotes the maximum necessary aperture length of the transducer 11, V denotes the platform speed, C denotes the sound speed, Rm denotes the maximum focal distance of a beam, D denotes a divided aperture length necessary for satisfying a required azimuth resolution, N denotes the number of multi-transmission/reception and Dm denotes a reduced aperture length resulting from the PRF adjustment. Further, $[X/Y]_{NL1}$ is representative of a calculation in which when X is divided by Y, the resulting quotient is produced if the residual is zero, or an integer closest to a quotient greater than the above quotient is produced if the residual is not zero.

Figure 4A:
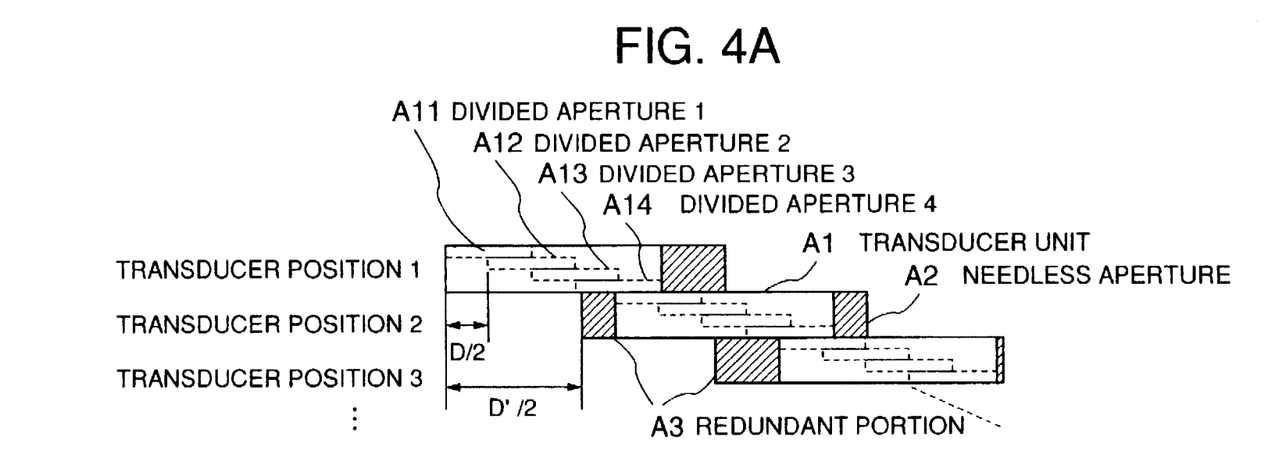
FIGS. 4A and 4B respectively show the operations of a transducer also included in the embodiment of FIG. 1 and to occur when PRF modification is not executed and when it is executed.
Figure 4B:
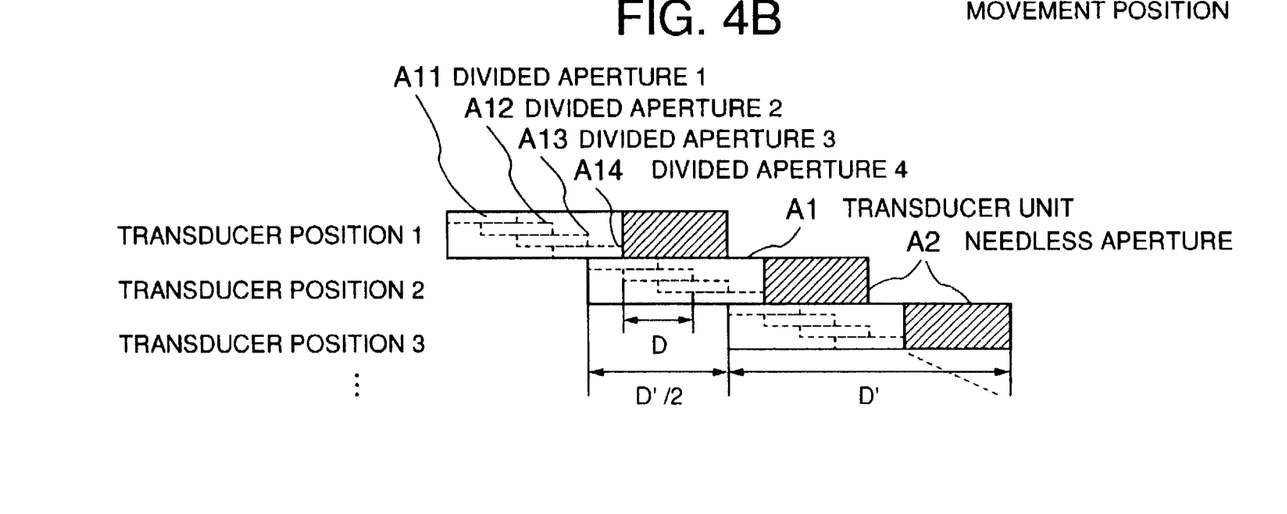

Reference will be made to FIGS. 4A and 4B for describing the aperture lengths of the transducer and the movement thereof to occur at the time of multi-aperture transmission/receipt. Assume that the number of apertures for multi-transmission/reception is four by way of example. As shown, the transducer labeled A1, has the maximum aperture length D' and moves from the current transmission/reception position to the next transmission/reception position during a single transmission. To satisfy the required azimuth resolution, nearby divided apertures are arranged at an interval of D/2. In FIGS. 4A and 4B, assume that the transducer A1 moves only in the horizontal direction, i.e., let the size in the vertical direction be neglected. Because the multi-aperture transmission/ reception system is adopted, the transducer A1 has divided apertures A11–A14 each having a length of D on its aperture surface. The aperture A11 is assigned to transmission/reception while the other apertures A12–A14 are exclusively assigned to reception.

FIG. 4A shows the movement of the transducer A1 to occur when the PRF modification is not executed. As shown, the distance of movement D'/2 of the transducer A1 is not an integral multiple of the distance D/2 between the apertures. Therefore, unless the unit A1 is provided with a redundant portion A3, the distance between the divided aperture 4 (A14) at the current position 1 of the transducer A1 and the position of the divided aperture 1 (A11) at the next position 2 cannot be D/2. The redundant portion A3 is sequentially shifted to the right of the transducer A1, as viewed in FIG. 4A, and is present at any time of transmission/reception without exception. As a result, the unit A1 needs the maximum aperture length D'.

By contrast, as shown in FIG. 4B, when the PRF modificator 14 in FIG. 1 adjusts the number of elements for the divided apertures, the integral multiple of one half of the divided aperture length D coincides with D'/2, i.e., one half of the maximum aperture length. Therefore, the right end of a divided aperture 3 (A13) coincides with the left and of the transducer A1 at the next transmission/ reception position, obviating the redundant portion A3 shown in FIG. 4A. Moreover, a needless aperture portion A2 always overlaps a divided aperture portion at the next transmission/reception position, so that a transducer with such a portion reduced can be mounted on a platform.

Referring again to FIG. 1, the divided aperture switch 16 holds the outputs of the receiver 15, switches, adds the outputs of the individual elements of the divided transducers, and feeds the resulting sums to the range compressing section 20. The switching and adding operation is repeated a number of times corresponding to the number of multi-transmission/reception N.

The range compressing section 20, like the range compressing section 200 of the conventional sonar system, has an FFT 21, an IFFT 22, a transmission replica signal generation 23, and another FFT 24. The section 20 compresses the pulse width of the received echo by determining a correlation between the signal input from the transducer 10 and a transmission replica signal prepared beforehand. The section 20 repeats such processing a number of times corresponding to the number of multi-transmission /reception N.

In the range curvature compensating section 30, the divided aperture propagation time calculation 32 calculates a signal propagation time between the divided aperture for transmission/reception and the beam focus, and also calculates the signal propagation time between the beam focus and the reception divided apertures, thereby producing a round-trip propagation time. The position of each divided aperture is determined on the basis of the product of the transducer movement time elapsed and the moving speed and the coordinates in the transducer. The position of beam focus is determined on the basis of the time elapsed after each transmission and the sound speed.

Figure 5:
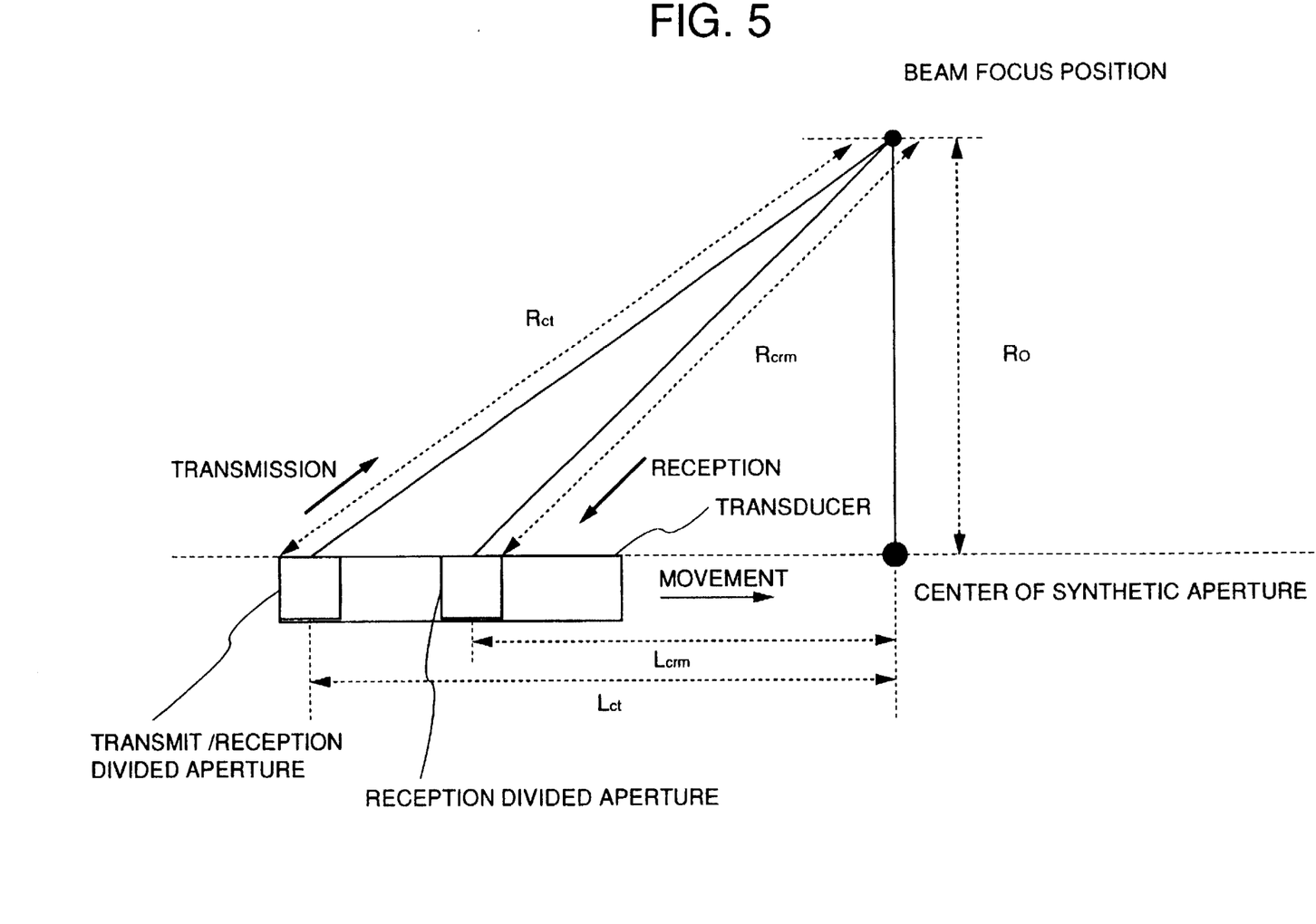
FIG. 5 shows a procedure in determining a round-trip propagation time between a divided aperture and a beam focus position by a divided aperture propagation time calculation also included in the embodiment of FIG. 1.

FIG. 5 shows the round-trip propagation distance between the divided aperture and the beam focus. There are shown in FIG. 5 a distance $R_o$ between the center of the synthetic aperture and the beam focus, a distance $T_{ct}$ between the transmission/reception divided aperture and the beam focus, and a distance $R_{crm}$ between the beam focus and the receipt divided aperture. There are also shown a distance $L_{ct}$ between the transmission/reception divided aperture and the center of the synthetic aperture, and a distance $L_{crm}$ between the reception divided aperture and the center of the synthetic aperture. The distance $R_o$ is the shortest distance between the surface of the synthetic aperture and the beam focus; the beam focus is present on a line perpendicular to the surface of the synthetic aperture.

The distances $R_{ct}$ and $R_{crm}$ are expressed as follows:

$$R_{ct}=(R_o^2+L_{ct}^2)^{1/2}$$

$$R_{crm}=(R_o^2+L_{crm}^2)^{1/2}$$

Therefore, the round-trip propagation distance with the divided aperture is $R_{ct}+R_{crm}$, and a difference $\Delta R_{crm}$ between it and the round-trip probation distance with the center of the synthetic aperture is produced by:

$$\Delta R_{crm}=(R_{ct}+R_{crm})-2R_o$$

It follows that a range curvature compensation amount $\Delta T_{crm}$ is produced by:

$$\Delta T_{crm}=\Delta R_{crm}/C$$

where C denotes the sound speed.

Assuming that the position where the synthetic aperture begins is the original, then the center of the synthetic aperture is expressed as $\lambda \cdot R_o/2D$ where $\lambda$ is the wavelength of the signal transmitted while D is the divided aperture length. The transmission/reception position of the transducer is represented by the product of the platform speed and the transducer moving time elapsed, and the position of the individual divided aperture on the transducer is a multiple of D. Therefore, when $L_{ct}$ and $L_{crm}$ are calculated at teach transmission/ reception position, the range curvature compensation amount at the individual aperture is unconditionally determined. The time shift 31 shifts the output data of the distance compressing section 20 with respect to time so as to effect range curvature correction.

The azimuth compressing section 40, like the conventional azimuth compressing section 400, is made up of an FFT 41, IFFT 42, a reference preparation 43, and another FFT 44. The output data of the range curvature compensating section 30 has been processed on the individual divided aperture along the time elapsed after a transmission, and therefore have a matrix structure in which the divided apertures and the times elapsed after a transmission are arranged in rows and columns, respectively. That is, the section 30 processes the individual row element in the column direction. By contrast, the azimuth compressing section 40 performs processing with the data on the divided apertures corresponding to the times elapsed after a transmission, i.e., performs processing with the individual row element or time elapsed in the row direction. The section 40 therefore compresses the received echo pulse width in the direction of movement of the transducer by determining a correlation between the output of the correcting section 30 and a reference signal in the divided aperture direction calculated for each time elapsed after a transmission.

The display section 50, like the display section 500 of the conventional sonar system, has a display processing 51 and a display 52. The display section 50 detects and thresholds the output of the azimuth compressing section 40 and thereby displays an image.

Figure 6:
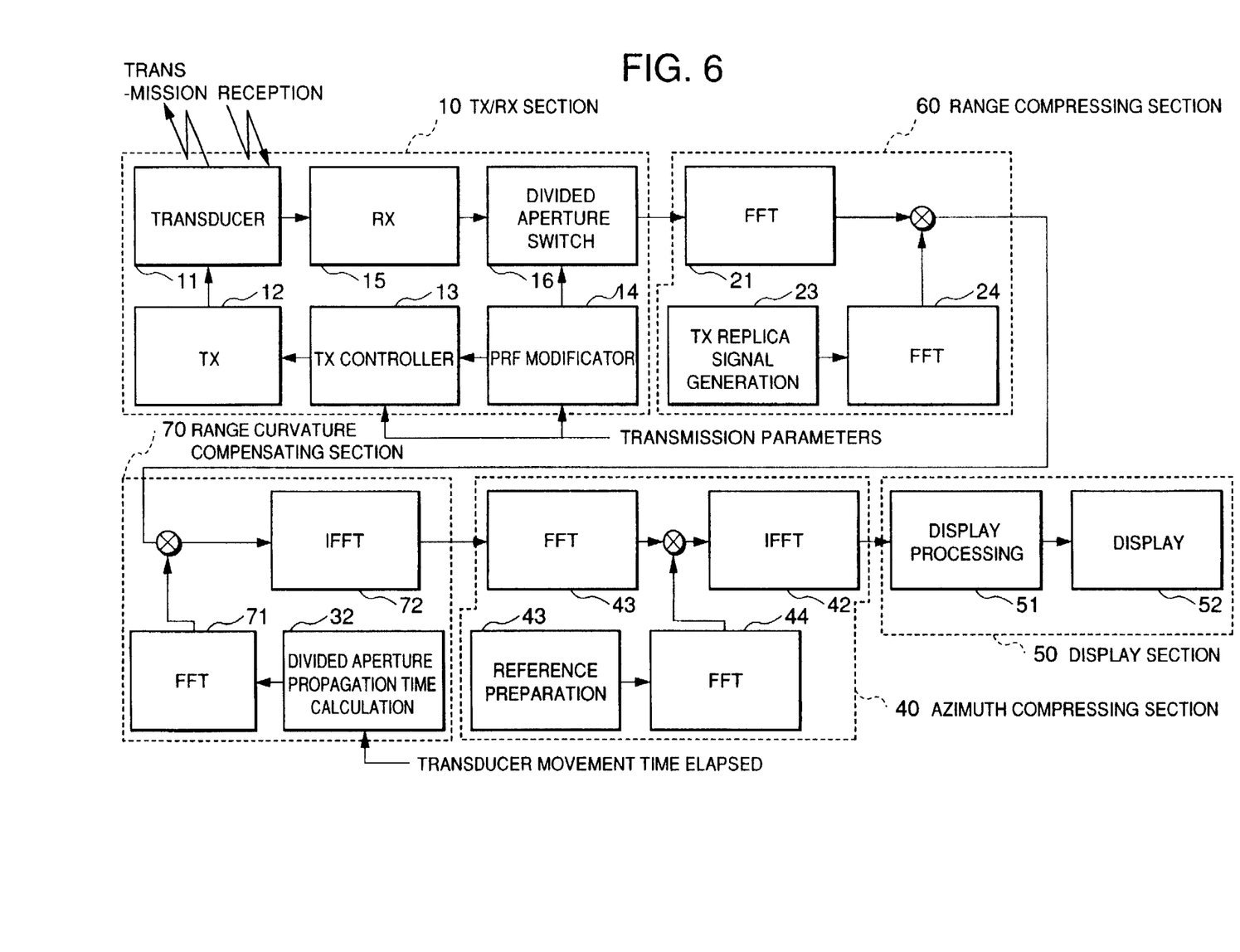
FIG. 6 is a block diagram schematically showing an alternative embodiment of the present invention.

Referring to FIG. 6, an alternative embodiment of the present invention will be described. As shown, a synthetic-aperture sonar system has a range compressing section 60 and a range curvature compensating section 70, a transmission/reception section 10, azimuth compressing section 40, and display section 50. T he sections 10, 40 and 50 each is constructed and operated i n the same manner as in the previous embodiment. The range compressing section 60 is different from the section 20 of the previous embodiment in that it lacks the IFFT 22. The range curvature correcting section 70 differs from the section 30 of the previous embodiment in that it additionally includes an FFT 71 and has a multiplier and an IFFT 72 in place of the time shift 31. Why such blocks are added or omitted is that the alternative embodiment executes the range curvature compensation in the frequency domain while the previous embodiment executes it in the time domain.

The embodiment shown in FIG. 6 operates, as follows. The blocks other than the FFT 71 and IFFT 72 are identical in operation with the corresponding blocks of the previous embodiment. The FFT 71 performs an FFT calculation with the time elapsed after a transmission and calculated by the divided aperture propagation time calculation 32 and the range curvature compensation matrix of the divided aperture, thereby outputting frequency domain data. It is to be noted that the FFT calculation is performed for the individual divided aperture in the direction of the time elapsed after a transmission. The outputs of the FFT 71 and the frequency domain data of each divided-aperture's output from the range compressing section 60 are multiplied and fed to the IFFT 72. The IFFT 72 transforms the input data to time domain data by IFFT and holds them in the form of a data matrix consisting of the time s elapsed after a transmission and the divided apertures. Further, the IFFT 72 sequentially delivers to the azimuth compressing section 40 the compensated divided aperture data of each time elapsed after a transmission.

Specific outputs available with the embodiment shown in FIG. 1 will be discussed hereinafter. The specific outputs to be described were obtained when the number of multi-transmission/reception was four, the frequency was 5 kHz, the platform speed was 1 m/s, and the divided aperture length was 2 m. The redundant portion of the transmission/reception unit was removed by the PRF modification.

Figure 7A:
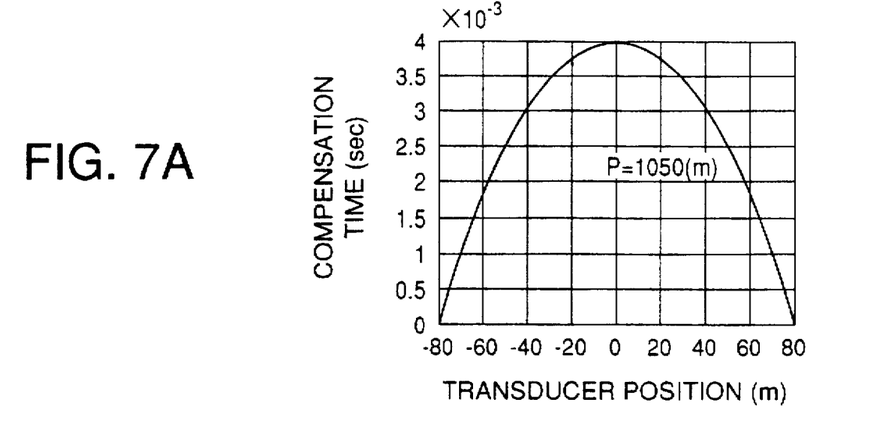
FIGS. 7A–7C are graphs respectively showing a range curvature compensation time, a range curvature compensation output signal, and an azimuth-compressed signal each appearing in ideal conditions.
Figure 7B:
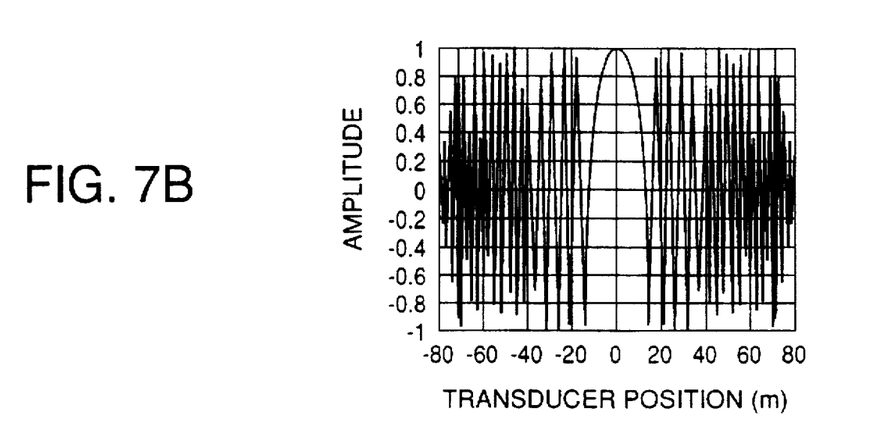
Figure 7C:
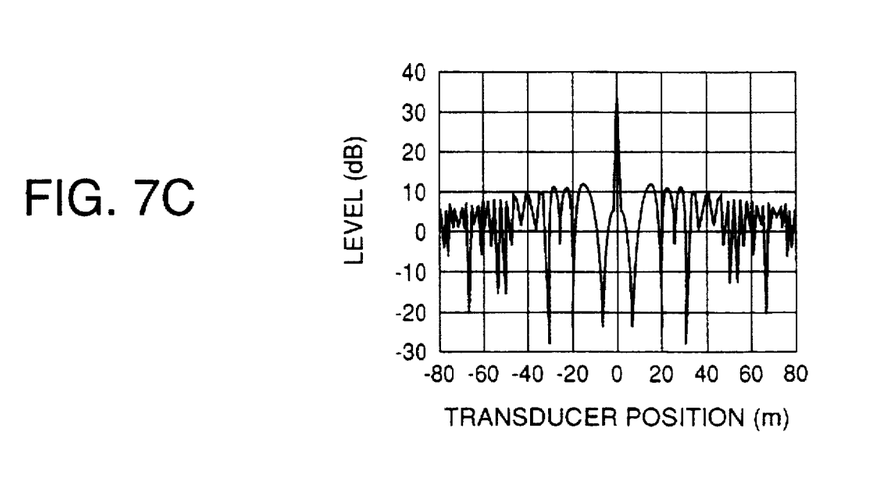
Figure 8A:
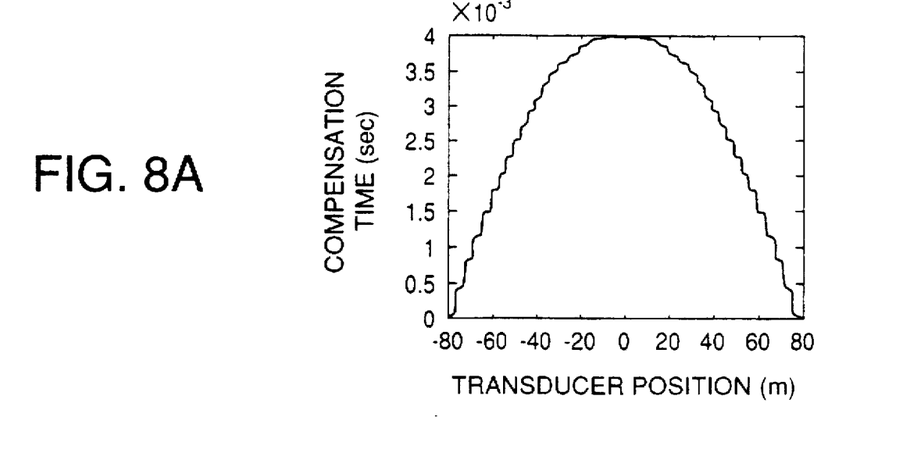
FIGS. 8A–8C are graphs respectively showing a range curvature compensation time, a range curvature compensated output signal, and an azimuth compression output signal achievable with the embodiment shown in FIG. 1.
Figure 8B:
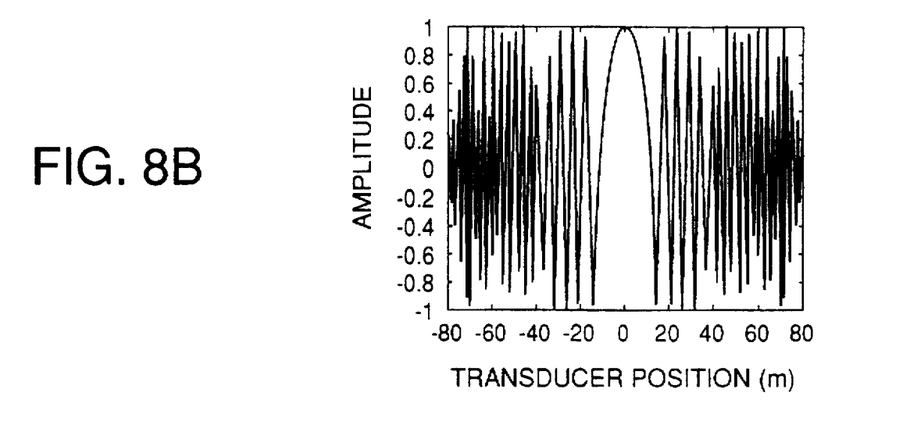
Figure 8C:
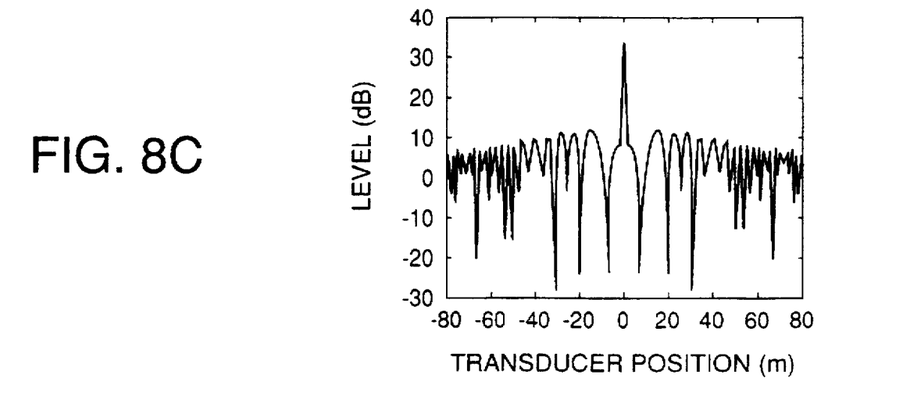

FIG. 7A shows ideal range curvature compensation times at a beam focus distance R of 1,050 m. In FIG. 7A, the abscissa indicates the position of the transducer, taking the center of the synthetic aperture as an original. The ordinate indicates the compensation time. FIGS. 7B and 7C respectively show a specific range curvature compensation output and a specific azimuth compression output corresponding to FIG. 7A. FIG. 8A shows a specific output of the divided aperture propagation time calculating section 32 of the embodiment while FIG. 8B shows a specific output of the range curvature compensation section 30 of the same. Further, FIG. 8C shows a specific output of the azimuth compressing section 40 of the embodiment. As FIGS. 7A–7C and 8A–8C indicate, the outputs under the ideal conditions and the outputs of the illustrative embodiment are sufficiently coincident with each other.

FIGS. 12A–12C show specific outputs of the propagation time calculating section 302, range curvature compensation section 300 and azimuth compressing section 400 of the conventional sonar system shown in FIG. 9 for comparison. As shown in FIG. 12B, the signal undergone range curvature compensation is distorts and increases the side lobe level, as shown in FIG. 12C. The outputs of the illustrative embodiment are far closer to the ideal outputs than the outputs of the conventional sonar system.

In summary, it will be seen that the present invention provides a synthetic-aperture sonar system having the following various unprecedented advantages. Because a round-trip propagation time is finely determined at the time of multi-aperture transmission/reception the system reduces range curvature compensation errors when use is made of a multi-aperture transmission/reception system.

Further, the platform speed, divided aperture length and PRF are delicately adjusted such that the multiple of the divided aperture length coincides with the required maximum aperture length, thereby obviating the redundant portion of a transducer. Therefore, when the multi-aperture transmission/reception system is applied to the synthetic-aperture sonar, the size of the transducer can be reduced below the required maximum aperture length.

Moreover, because the aperture length required of the transducer is reduced, the number of multi-transmission/reception can be increased within an allowable range dependent on the size of a vehicle. This eases limitations on the number of multi-transmission/reception ascribable to the platform speed and particular to the case wherein the multi-aperture transmission/reception system is applied to the synthetic-aperture sonar.

What is claimed is:

1. A synthetic-aperture sonar system comprising:
    a transmission/reception section comprising:
        a transducer having an aperture divided into a plurality of divided apertures one of which is assigned to transmission and reception of a sound wave and the others of which are assigned to reception of a sound wave;
        a PRF modificator for adjusting, based on at least one of a platform speed and a divided aperture length, a pulse repetition frequency and for controlling switching of the divided apertures assigned to reception;
        a transmitter;
        a transmitter controller for controlling said transmitter in accordance with control parameters of said PRF modificator, said transmitter generating a sound wave to be transmitted in response to a command output from said transmitter controller and outputting said sound wave signal to said divided aperture assigned to transmission and reception;
        a receiver for amplifying a received sound wave signal output from said transducer, digitizing said received sound wave signal, and outputting a resultant digital signal; and
        a divided aperture switch for temporarily holding outputs of said transducer, switching, under control of said PRF modificator, the output of said transducer corresponding to any particular divided aperture, and outputting a resultant sum;
    a range compressing section for compressing a pulse width of the received sound signals in a direction of transmission;
    a range curvature compensating section for synchronizing receipt times of said divided apertures with respect to outputs of said range compressing section; and
    an azimuth compressing section for compressing pulse widths of outputs of said range curvature compensating section in a direction of platform movement.

2. A synthetic-aperture sonar system as claimed in claim 1, wherein said PRF modification adjusts said pulse repetition frequency such that a ratio between the aperture length of said transducer and the divided aperture length of said transducer is integral multiple.

3. A synthetic-aperture sonar system as claimed in claim 1, further comprising:
    a display section for executing displaying processing with outputs of said azimuth compression section and displaying processed outputs in a form of an range.

4. A synthetic-aperture sonar system comprising:
    a transmission/reception section comprising a transducer unit having an aperture divided into a plurality of divided apertures one of which is assigned to transmission and reception of a sound wave and the others of which are assigned to reception of a sound wave, for generating, controlling and transmitting a sound wave signal to be transmitted, and for amplifying and digitizing a received sonic wave signal and outputting a resulting digital signal;
    a range compressing section for compressing a pulse width of the received sound signals in a direction of transmission;
    a divided aperture propagation time calculating section for determining a range curvature compensating time on the basis of a sound wave signal propagation time between a beam focus and said divided aperture assigned to transmission and reception and a sound wave signal propagation time between said beam focus and the divided aperture assigned to reception;
    a range curvature compensating section for time-shifting, in accordance with said range curvature compensating time, data of the individual divided aperture and output from said range compressing section to thereby compensating a deviation in phase between the divided apertures;
    an azimuth compensating section for executing pulse width compression with outputs of said range curvature compensating section in a direction of movement of a platform; and
    a display section for executing display processing with outputs of said azimuth compression section and displaying processed outputs in a form of an image.

5. A synthetic-aperture sonar system comprising:

a transmission/reception section comprising:

a transducer unit having an aperture divided into a plurality of divided apertures one of which is assigned to transmission and reception of a sound wave and the others of which are assigned to reception of a sound wave, said transducer unit including a plurality of transducing elements;

a PRF modificator for adjusting, based on at least one of a speed and a divided aperture length, a pulse repetition frequency such that a ratio between an aperture length of said transducer unit and a divided aperture length of said transducer unit is an integral multiple, and for controlling switching of the divided apertures assigned to reception;

a transmitter;

a transmitter controller for controlling said transmitter in accordance with control parameters of said PRF modificator, said transmitter generating a sound wave to be transmitted in response to a command output from said transmitter controller and outputting said sound wave signal to said divided aperture assigned to transmission and reception;

a receiver for amplifying a received sound wave signal output from said transducer unit, digitizing said received sound wave signal, and outputting a resulting digital signal; and a divided aperture switch for temporarily holding outputs of transducing elements included in said transducer unit, switching and adding, under control of said PRF modificator, the output of the transducing elements corresponding to any particular divided aperture, and outputting a resulting sum;

a range compressing section for compressing a pulse width of the received sound signals in a direction of transmission;

a range curvature compensating section for synchronizing receipt times of said divided apertures with respect to outputs of said distance compressing section;

an azimuth compressing section for compressing pulse widths of outputs of said range curvature compensating section in a direction of movement; and a display section for executing display processing with outputs of said azimuth compression section and displaying processed outputs in a form of an image.

* * * * *